United States Patent [19]

Priest

[11] 4,282,331

[45] Aug. 4, 1981

[54] POLYURETHANE FOAM PREPARED FROM A COPOLYMER/POLYOL COMPOSITION

[75] Inventor: David C. Priest, Charlotte, N.C.

[73] Assignee: Union Carbide Corporation, New York, N.Y.

[21] Appl. No.: 122,483

[22] Filed: Feb. 19, 1980

Related U.S. Application Data

[60] Division of Ser. No. 417,487, Nov. 20, 1973, Pat. No. 4,208,314, which is a continuation-in-part of Ser. No. 176,317, Aug. 30, 1971, abandoned.

[51] Int. Cl.$^3$ .............................................. C08G 18/14
[52] U.S. Cl. .................................. 521/137; 521/170; 521/174
[58] Field of Search .......................... 521/137, 170, 174

[56] References Cited

U.S. PATENT DOCUMENTS

| | | | |
|---|---|---|---|
| 3,304,273 | 2/1967 | Stamberger | 521/88 |
| 3,383,351 | 5/1968 | Stamberger | 260/33.2 |
| 3,385,246 | 10/1968 | Harris | 260/85.5 |
| 3,407,246 | 10/1968 | Harris | 525/258 |
| 3,418,354 | 12/1968 | Wheeler | 260/448.2 |
| 3,523,093 | 8/1970 | Stamberger | 521/88 |
| 3,652,639 | 3/1972 | Pizzini et al. | 260/465.4 |
| 3,823,201 | 7/1974 | Pizzini et al. | 525/258 |

FOREIGN PATENT DOCUMENTS

| | | |
|---|---|---|
| 735010 | 5/1966 | Canada . |
| 785835 | 5/1968 | Canada . |
| 1152536 | 2/1964 | Fed. Rep. of Germany . |
| 1152537 | 2/1964 | Fed. Rep. of Germany . |

*Primary Examiner*—Maurice J. Welsh
*Attorney, Agent, or Firm*—Richard J. Gallagher

[57] ABSTRACT

This invention relates to a novel process for producing polymer/polyols characterized by the use of specific amounts of particular monomer combinations and by maintaining a low monomer concentration throughout the reaction mixture during the process. The monomer combinations are acrylonitrile or methacrylonitrile and styrene or alpha-methyl styrene. The process produces novel polymer/polyols characterized by their convertibility to low density, water-blown polyurethane foams having reduced scorch and by the relatively small size of the polymer particles.

10 Claims, No Drawings

POLYURETHANE FOAM PREPARED FROM A COPOLYMER/POLYOL COMPOSITION

CROSS REFERENCE TO RELATED APPLICATIONS

This is a division of U.S. Patent Application Ser. No. 417,487 which was filed on Nov. 20, 1973, which is now U.S. Pat. No. 4,208,314, issued June 17, 1980, and which was in turn a continuation-in-part of U.S. patent application Ser. No. 176,317, which was filed on Aug. 30, 1971 and which is now abandoned.

Polymer/polyol compositions suitable for use in producing polyurethane foams are known materials. Such compositions can be produced by polymerizing one or more olefinically unsaturated monomers dissolved or dispersed in a polyol in the presence of a free radical catalyst. These polymer/polyol compositions have the valuable property of imparting to polyurethane foams produced therefrom higher load-bearing properties than are imparted by unmodified polyols.

The polymer/polyol compositions that have found commercial acceptance prior to the present invention are primarily compositions produced from polyols and acrylonitrile or acrylonitrile-methyl methacrylate mixtures. Such compositions are used commercially in producing foams under conditions such that the heat generated during foaming is readily dissipated (e.g., the foams are of relatively thin cross-section) or under conditions such that relatively little heat is generated during foaming. An important source of heat in the formation of polyurethane foams is the reaction of water and isocyanato groups and this reaction is often used to generate carbon dioxide which foams the polyurethane. In such cases, the foam density decreases (and the amount of heat generated increases) as the amount of water employed is increased. When one of the above-commercially available polymer-polyol compositions is used under conditions such that the heat generated during foaming is not readily dissipated (e.g., when relatively thick slab-stock is being produced) or under conditions such that a sufficient amount of water is used to produce a polyurethane foam having a density less than 1.75 pounds per cubic foot, the heat generated results in severe discoloration (scorch) of the foam.

Polymer/polyol compositions produced from polyols and acrylonitrile-styrene mixtures are disclosed in Canadian Patent No. 785,835. Low density, water-blown polyurethane foams produced from the compositions of the Canadian Patent made from monomer mixtures having high acrylonitrile to styrene ratios are also subject to severe scorch. The process for producing such compositions disclosed in the Canadian Patent is not completely satisfactory, mainly because of the formation of large granules in the reaction mixtures. As a result, the compositions produced by the process of this Canadian Patent contain such granules which create difficulties in the preparation, handling and utilization of the compositions, (e.g., the granules can clog the reactor in which the compositions are made and the filters in the feed lines in machines in which polyurethane foams are produced from the compositions). Accordingly, such compositions have not achieved commercial success to date.

It is an object of this invention to provide a process for producing polymer/polyol compositions that can be used to produce low density water-blown polyurethane foams having reduced scorch and that contain relatively small polymer particles.

It is an object of this invention to provide polymer/polyol compositions that can be used to produce low density, water-blown polyurethane foams having reduced scorch and that contain relatively small polymer particles.

Other objects of this invention will be apparent from the description thereof appearing below.

This invention is based on the discovery that polymer/polyol compositions having improved properties can be produced by the proper selection of the type and relative amounts of olefinically unsaturated monomers and by maintaining a low monomer to polyol ratio throughout the reaction mixture during the production of the polymer polyols so as to provide a polymer consisting essentially of polymer particles having diameters less than one micron. Thus, this invention provides a process for producing a fluid polymer/polyol composition from reaction mixtures containing polyol and monomer which process comprises polymerizing, in the presence of a free radical catalyst and while maintaining a low monomer concentration throughout the reaction mixture during the polymerization, (1) from 10 to 30 weight percent of a monomer mixture of (a) from 33 to 75 weight percent of acrylonitrile or methacrylonitrile and (b) from 25 to 67 weight percent styrene or alpha-methyl styrene, said weight percents of the nitrile and the styrene or alphamethyl styrene being based on the total weight of those materials, dissolved or dispersed in (2) from 70 to 90 weight percent of a normally liquid polyol having a hydroxyl number from 20 to 150, said weight percents of the monomer mixture and polyol being based on the total weight of the monomer and the polyol.

The polymer polyols produced by the process of this invention are novel compositions of matter characterized by the relatively small particle size of the polymers therein which greatly facilitates their preparation, handling and utility in producing polyurethane foams having less scorch than polyurethane foams produced from an otherwise identical polymer/polyol wherein the styrene or alpha-methyl styrene is replaced by acrylonitrile or methacrylonitrile.

The polymers in the polymer polyols of this invention are present as discrete polymer particles are relatively small agglomerates resulting from the coalescing of two or more discrete particles. There is a random distribution of such discrete particles and agglomerates in the polymer polyols. The term "particle size" as used herein refers to the number average size of such discrete particles and agglomerates. The polymer polyols are free of large polymer particles (large granules produced by the coalescing of many discrete particles) in an amount that would impair the preparation, handling and utilization of the polymer polyols.

The polyols useful in producing polymer/polyol compositions in accordance with this invention can be a polyhydroxyalkane, a polyoxyalkylene polyol, or the like. Among the polyols which can be employed are one or more polyols from the following classes of compositions, alone or in admixture, known to those skilled in the polyurethane art.

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;

(d) Alkylene oxide adducts thereof of polyphenols;

(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4- , 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like; preferably the adducts of ethylene oxide, propylene oxide, epoxybutane, or mixtures thereof. A preferred class of alkylene oxide adducts of polyhydroxyalkanes are the ethylene oxide, propylene oxide, butylene oxide, or mixtures thereof, adducts of trihydroxyalkanes.

A further class of polyols which can be employed are the alkylene oxide adducts of the nonreducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are found, for example, bisphenol A, bisphenol F, condensation products of phenol and formaldehyde, the novolac resins; condensation products of various phenolic compounds and acrolein; the simplest member of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol)ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such as tripolyphosphoric acid, the polymetaphosphoric acids, and the like are desirable for use in this connection.

The polyols employed can have hydroxyl numbers which vary over a wide range. In general, the hydroxyl numbers of the polyols employed in the invention can range from about 20, and lower, to about 150, and higher. The hydroxyl number is defined as the number of milligrams of potassium hydroxide required for the complete hydrolysis of the fully phthalated derivative prepared from 1 gram of polyol. The hydroxyl number can also be defined by the equation:

$$OH = (56.1 \times 1000 \times f)/m.w.$$

where

OH = hydroxyl number of the polyol f = functionality, that is, average number of hydroxyl groups per molecule of polyol m.w. = molecular weight of the polyol The exact polyol employed depends upon the end-use of the polyurethane product to be produced. The molecular weight or the hydroxyl number is selected properly to result in flexible or semi-flexible foams or elastomers when the polymer/polyol produced from the polyol is converted to a polyurethane. The polyols preferably possess a hydroxyl number of from about 50 to about 150 for semi-flexible foams and from about 30 to about 70 for flexible foams. Such limits are not intended to be restrictive, but are merely illustrative of the large number of possible combinations of the above polyol coreactants.

Preferably, the polyols have viscosities from 100 to 2000 centipoises at 25° C. and are the propylene oxide or propylene oxide and ethylene oxide adducts of dihydroxyalkanes or trihydroxyalkanes. The polyols preferably should be free of groups that catalyze internal cyclization of poly(acrylonitrile) or poly(methacrylonitrile) [as described below]and/or decomposition of the catalysts. Such groups are generally basic groups (e.g., amino groups).

Acrylonitrile is employed as a monomer in this invention because it forms polymer polyols having superior load-bearing properties and stability to phase separation. The selection of styrene as a comonomer of choice with acrylonitrile or methacrylonitrile was based upon cost, availability and relative reactivity with acrylonitrile. Thus, styrene is inexpensive and readily available in high purity. Of further consideration in the selection of comonomer is the glass-transition temperature (Tg) of the anticipated copolymer. As is obvious to one skilled in the art, the glass-transition temperature of the copolymer in the polymer/polyol must be higher than the anticipated foam use temperature in order to confer load-bearing characteristics. The Tg of a 50/50 weight percent acrylonitrile-styrene copolymer is approximately 108° C. The selection of methacrylonitrile as a comonomer of choice with styrene or α-methylstyrene is based on its lower color-formation tendency (compared to acrylonitrile) and favorable copolymerization kinetics with styrene and α-methylstyrene. Methacrylonitrile has also a high homopolymer glass-transition temperature (Tg > 100° C.). The selection of α-methylstyrene as a comonomer of choice with acrylonitrile or methacrylonitrile is based on its relative reactivity with acrylonitrile or methacrylonitrile, high homopolymer glass-transition temperature, and low cost.

With regard to the relative amounts of the polyols and monomers used in the process of this invention, the reaction mixture contains: (1) from 10 to 30 weight percent of a monomer mixture of (a) from 33 to 75 weight percent of acrylonitrile or methacrylonitrile and (b) from 25 to 67 weight percent styrene or alphamethyl styrene, said weight percents of the nitrile and the styrene or alphamethyl styrene being based on the total weight of those materials and (2) from 70 to 90 weight percent of a normally liquid polyol, said weight percents of the monomer mixture andd polyol being based on the total weight of the monomer and the polyol. When less than 10 weight percent of the monomer mixture is employed in the reaction mixture, less than desired load bearing enhancement may be conferred upon the polyurethane foam prepared therefrom, and, when more than 30 weight percent of the monomer mixture is employed in the reaction mixture, the resultant polymer-polyol viscosity is higher than is desirable. When less than 33 weight of the nitrile is employed in the monomer mixture, the polymer/polyol viscosity is higher than desirable, and, when more than 75 weight percent of the nitrile is employed in the monomer mixture, the resultant low density polyurethane foam (high water level formulation) prepared therefrom will have greater than desired "scorch" (discoloration).

The catalyst useful in producing polymer/polyol compositions in accordance with this invention are the well known free radical type of vinyl polymerization catalysts for the formation of polymer polyols, for example, the peroxides and azo compounds such as azobisisobutyronitrile, and the like. The polymerization can also be carried out with an inert organic solvent present that doesn't dissolve the polymer. Illustrative thereof are toluene, benzene, acetonitrile, ethyl acetate, hexane, heptane, dicyclohexane, dioxane, acetone, N,N-dimethylformamide, N,N-dimethylacetamide, and the like, including those known in the art as being suitable solvents for the polymerization of vinyl monomers. The only requirement in the selection of the solvent and the polyol is that they do not interfere with the monomer's polymerization reaction. When an inert organic solvent is used, it is generally removed from the reaction mixture by conventional means before the polymer/polyol is used to produce polyurethane foams.

The process of this invention involves maintaining a low monomer to polyol ratio throughout the reaction mixture during the process so as to provide a polymer polyol containing a polymer consisting essentially of polymer particles having diameters less than one micron. Such is achieved by employing process conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol. The temperature employed is any temperature at which the half life of the catalyst is no longer than six minutes. The mixing conditions employed are those attained using a back mixed reactor (e.g., a stirred flask or stirred autoclave). Such reactors keep the reaction mixture relatively homogeneous and so prevent localized high monomer to polyol ratios such as occur in certain tubular reactors (e.g., in the first stages of "Marco" reactors when such reactors are operated conventionally with all the monomer added to the first stage). However, tubular reactors (e.g., Marco reactors) can be employed if modified so that increments of the monomer are added to various stages.

The polymer polyols produced in the above-described back-mixed reactors in accordance with the process of this invention contain small amounts of unreacted monomers. Such residual monomers can be converted to additional polymer by employing a two-stage operation in which the product of the first stage (the back-mixed reactor) is passed into a second stage which can be a Marco reactor operated conventionally or an unstirred column reactor. The temperature in the second stage is that at which the half life of the catalyst is no longer than six minutes but no back mixing is employed.

The temperature used in producing polymer/polyol compositions in accordance with this invention is any temperature at which the half life of the catalyst is no longer than six minutes (preferably no longer than from 1.6 to 2 minutes). The half lives of the catalysts become shorter as the temperature is raised. The maximum temperature used is not narrowly critical but should be lower than the temperature at which significant decomposition of the reactants or product occurs.

The half lives of such catalysts are known properties of those materials and are measured by known methods. The half lives are conventionally measured while the catalyst is dissolved in a solvent that is substantially non-reactive with the catalyst and that does not decompose the catalyst. Such solvents include liquid hydrocarbon and liquid halohydrocarbons. Reactive liquids (e.g., liquid amines) are not suitable solvents.

The temperature at which the half lives of typical catalysts are six minutes are:

| Catalyst | Temperature (°C.) |
| --- | --- |
| Azobisisobutyronitrile | 100° C. |
| Lauroyl Peroxide | 100° C. |
| Decanoyl Peroxide | 100° C. |
| Benzoyl Peroxide | 115° C. |
| p-Chlorobenzoyl Peroxide | 115° C. |
| t-Butyl Peroxyisobutyrate | 115° C. |
| Acetyl Peroxide | 105° C. |
| Propionyl Peroxide | 102° C. |
| 2,4-Dichlorobenzoyl Peroxide | 95° C. |
| t-Butyl Peroxypivalate | 95° C. |

In the process of this invention, the monomers are polymerized in the polyol. Usually, the monomers are soluble in the polyol. It has been found that first dissolving the monomers in a minor portion of the polyol and adding the solution so formed to the remainder of the polyol at reaction temperature facilitates mixing of the monomers in the polyol and can reduce or eliminate reactor fouling. When the monomers are not soluble in the polyols, known techniques (e.g., dissolution of the insoluble monomers in another solvent) can be used to disperse the monomers in the polyol prior to polymerization. The conversion of the monomers to polymers achieved by the process of this invention is remarkably high (e.g., conversions of at least 90% to 95% of the monomers are generally achieved).

Without wishing to be bound by any particular theory, it appears that the initial yellow color of commercially available polymer/polyols derived from acrylonitrile or acrylonitrile-methyl methacrylate mixtures and the scorch of the foams prepared therefrom are both caused by the internal cyclization of the contained poly(acrylonitrile) to a "ladder" type polymer containing the chromophoric conjugated polyimine structure. A sequence length of this chromophore in excess of three repeating units is known to absorb visible light; i.e., produce discoloration. It is postulated that the structure of the chromophore is as follows:

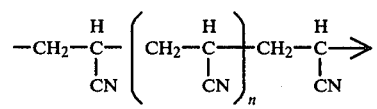

Poly(acrylonitrile)

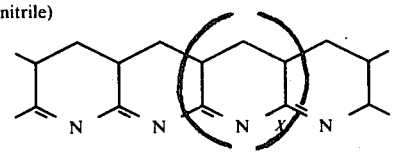

"Ladder type" polymer

It is known that the inclusion of a non-cyclizing monomer into the polymer chain at the proper frequency can prevent the formation of long sequence runs of the chromophoric cyclized poly(acrylonitrile).

Polymer/polyol viscosity is a complex function of contained polymeric content, initial polyol viscosity, polymerization temperature, and, in this case, copolymer composition. While the first two parameters are generally considered to be governed by Haganmacker equation, the effect of polymerization temperature and copolymer composition are not so readily understood. It is believed that the effect of temperature and copolymer composition involve the type and degree of grafting being affected by changing these two sensitive parameters. It is also recognized that changing the polymer composition affects the copolymer density as well as the particle polarity which, as is known, will dramatically change dispersion viscosity.

Prior attempts (Canadian Patent No. 785,835) to prepare polymer/polyols from acrylonitrile and styrene using azobisisobutyronitrile as a catalyst were plagued with reactor plugging due to "gravel" sized particle formation. In addition, the polymer/polyols made from monomer mixtures having high acrylonitrile to styrene ratios produced foams that scorched severely. This prior process was carried out under conditions essentially equivalent to the conditions used in the process of the present invention with the exception that the polymerization in the prior process was conducted in a manner that permitted a relatively high concentration of monomer in the initial section of the tubular reactor employed. It is believed that less graft copolymer formed and less graft copolymer was present to maintain the polymer particles in suspension in the polyol. Consequently, the polymer particles coalesced to a larger extent to form granules in the process of the Canadian Patent. Hence, the prior process produced compositions containing relatively large granules (e.g., over 0.1 inch in diameter) which interfere with the preparation, handling and utilization of the compositions whereas the present process produces compositions essentially free of such granules and consisting essentially of relatively small (e.g., less than one micron in diameter) particles which remain suspended in the liquid phase of the polymer/polyol. Thus, the compositions of this invention are suspensions containing a liquid phase comprising unreacted polyol having suspended therein small solid particles comprising homopolymers and/or copolymers of the nitrile and styrene monomer. The compositions also contain various polymerpolyol graft copolymers having different polymer contents which are believed to stabilize the suspended polymer particles. Those graft copolymer species having a low polymer content (high polyol content) will be in the liquid phase of the suspension while those species having a high polymer content will also be suspended solids.

It is known that as the polymerization temperature is raised (i.e., 95° to 115° C.), the reactivity ratio values of acrylonitrile and styrene or for that matter, any two dissimilar monomers become more equivalent. Such being the case, higher polymerization temperatures apparently make a somewhat more nearly random copolymer and thereby helps achieve better foam properties as regards to foam scorch resistance.

The process of this invention produces polymer/polyol compositions having properties markedly different from polymer/polyol compositions produced from the same starting materials as described in Canadian Patent 785,835. Hence, the polymer/polyol compositions of this invention are novel compositions of matter. However, in view of the state of the art and the complex nature of structure-property relationships in these compositions discussed above, it is difficult to fully characterize the novel compositions of this invention in terms of their exact chemical structure.

Hence, the compositions of this invention are best described in terms of the relative amounts and type of polyols and monomers used to produce them and in terms of their most outstanding properties, i.e., their ability to impart anti-scorch properties to polyurethane foams and their polymer particle size (with resultant ease of preparation, handling and utilization). In addition, the polymer/polyol compositions of this invention are white or cream colored liquids that can have relatively low viscosities (e.g., viscosities from 1000 to 2500, preferably from 1000 to 1500, centipoises at 25° C.). Further, the low density polyurethane foams (i.e., foams having densities less than 1.75 pounds per cubic foot) produced from these compositions have very good elongations (from 115% to 150% measured by ASTM D1564–69), tear strengths (from 2.50 to 3.50 pounds per square inch measured by ASTM D1564–69) and 90% compression sets (from 3.0 to 15 measured by ASTM D1564–69).

The invention also provides a method for producing a flexible or semi-flexible polyurethane foam by reacting and foaming: (a) a polymer/polyol composition of this invention, (b) an organic polyisocyanate, (c) a catalyst for the reaction of (a) and (b) to produce the polyurethane, (d) a blowing agent and (e) a foam stabilizer. The reaction and foaming operations can be performed in any suitable manner, preferably by the one-shot technique.

The organic polyisocyanates that are useful in producing polyurethane foams in accordance with this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates) as well as known triisocyanates. As examples of suitable polyisocyanates one can mention 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl)ether of 1,4-butylene glycol, 1,11-diisocyanatoundecane, 1,12-diisocyanatododecane bis-(isocyanatohexyl)sulfide, 1,4-diisocyanatobenzene, 2,4-diisocyanatotoluene, 2,6-diisocyanato tolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene and mixtures thereof.

The catalysts that are useful in producing polyurethane foams in accordance with this invention include:
(a) tertiary amines such as bis(dimethylaminoethyl)ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, pyridine oxide and the like;

(b) tertiary phosphines such as trialkylphosphines, dialkylbenzylphosphines, and the like;

(c) strong bases such as alkali and alkaline earth metal hydroxides, alkoxides, and phenoxides;

(d) acidic metal salts of strong acids such as ferric chloride, stannic chloride, stannous chloride, antimony trichloride, bismuth nitrate and chloride, and the like;

(e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylene-diimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as the well known chelates of titanium obtained by said or equivalent procedures;

(g) salts of organic acids with a variety of metals such as alkali metals, alkaline earth metals, Al, Sn, Pb, Nn, Co, Ni, and Cu, including, for example, sodium acetate, potassium laurate, calcium hexanoate, stannous acetate, stannous octoate, stannous oleate, lead octoate, metallic driers such as manganese and cobalt naphthanate, and the like;

(h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g. dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltinbis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on weight of the reaction mixture.

Foaming is accomplished by employing a small amount of a polyurethane blowing agent, such as water, in the reaction mixture (for example, from about 0.5 to about 5 weight percent of water, based upon total weight of the polymer/polyol composition), or through the use of blowing agents which are vaporized by the exotherm of the reaction, or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, octafluorocyclobutane, and the like. Another class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product. The anti-scorch properties of the polymer/polyol compositions are most evident when at least some of the blowing agent is water and the water is used in an amount that results in a foam having a density less than 1.75 pounds per cubic foot. Generally, the use of water in an amount of at least 3.0 percent by weight based on the total weight of the polymer/polyol composition results in a foam having a density of less than 1.75 pounds per cubic foot.

It is also within the scope of the invention to employ small amounts, e.g., about 0.001% to 5.0% by weight, based on the total reaction mixture, of a foam stabilizer such as a "hydrolyzable" polysiloxane-polyoxyalkylene block copolymer such as the block copolymers described in U.S. Pat. Nos. 2,834,748 and 2,917,480. Another useful class of foam stabilizers are the "nonhydrolyzable" polysiloxane-polyoxyalkylene block copolymers such as the block copolymers described in U.S. Pat. No. 3,505,377; U.S. patent application Ser. No. 888,067, filed Dec. 24, 1969 and British Patent Specification No. 1,220,471. The latter class of copolymers differs from the above-mentioned polysiloxane-polyoxyalkylene block copolymers in that the polysiloxane moiety is bonded to polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer with the remainder being polyoxyalkylene polymer.

Polyurethane foams produced in accordance with this invention are useful in the applications in which foams made from conventional polymer/polyols are employed and are particularly useful as arm rests crash pads and mattresses.

The following Examples illustrate the present invention.

Definitions

As used in the Examples appearing below, the following designations, symbols, terms and abbreviations have the indicated meanings:

Polyol I: A polypropylene oxide triol produced from propylene oxide and glycerine and having a molecular weight of about 3,000.

Polyol II: A polyalkylene oxide triol produced from propylene and ethylene oxides and glycerine and having a molecular weight of about 3,700. The alkylene oxide units are present primarily in blocks and the primary OH content is about 57.5%. The ethylene oxide is used to "cap" the triol. Based on its alkylene oxide content, this triol contains 90 wt-% $C_3H_6O$ and 10 wt-% $C_2H_4O$.

Polyol III: A polyalkylene oxide triol produced from propylene and ethylene oxides and glycerine and having a molecular weight of about 4,900. The alkylene oxide units are present primarily in blocks and the primary OH content is about 75%. The ethylene oxide is used to "cap" the triol. Based on its alkylene oxide content this triol contains 85 wt-% $C_3H_6O$ and 15 wt-% $C_2H_4O$.

Polyol IV: A polyalkylene oxide triol produced from propylene and ethylene oxides and glycerine and having a molecular weight of about 3700. The alkylene oxide units are present primarily in blocks and the primary OH content is about 2.5%. Based on its alkylene oxide content, this triol contains 86 wt-% $C_3H_6O$ and 14 wt-% $C_2H_4O$.

Polymer/Polyol A: A commercially available polymer/polyol produced by polymerizing 20 weight percent acrylonitrile in 80 weight percent Polyol I.

Polymer/Polyol B: A polymer/polyol produced by polymerizing 18 weight percent styrene and 1 weight percent divinyl benzene in 81 weight percent Polyol I.

Polymer/Polyol C: A commercially available polymer/polyol produced by polymerizing 10 weight percent acrylonitrile and 10 weight percent methyl methacrylate in 80 weight percent in Polyol I.

Polymer/Polyol D: A polymer/polyol produced by polymerizing 20 weight percent acrylonitrile in 80 weight percent Polyol III.

Surfactant I: $MeSi[(OSiMe_2)_{6.2}(OC_2H_4)_{18}(OC_3H_6)_{14}OBu]_3$ wherein Me is methyl and Bu is butyl.

Surfactant II

A mixture of:

55 wt-% 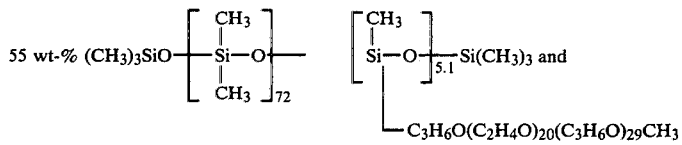

45 wt-% of an admixture of:
$C_4H_9O(C_2H_4O)_{18}(C_3H_6O)_{13.7}H$ (90 wt-%) and
$C_9H_{19}C_6H_4O[C_2H_4O]_{10.5}H$ (10 wt-%)

Surfactant III

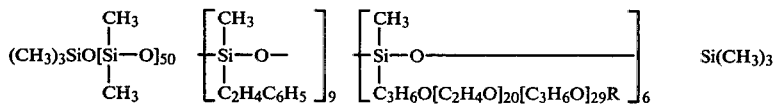

wherein R is 90 mole % $CH_3$ groups and 10 mole %

groups.

TDI: A mixture of 80 weight percent 2,4-tolylene diisocyanate and 20 weight percent 2,6-tolylene diisocyanate.

parts: parts by weight
"Ionol": 2,6-di-tert-butyl-4-methylphenol
3CF: tris(beta-chloroethyl)phosphate
stripped: volatile materials removed by heating at reduced pressure
VCN: acrylonitrile
rpm: revolution per minute
cps.: centipoises at 25° C. using number 3 spindle on a Brookfield viscometer; 100 rpm
min.: minute
wt.: weight
%: percent Test Procedures The following test procedures were used in the Examples appearing below:

| Test | Procedure |
|---|---|
| Indentation Load Deflection (ILD) | ASTM D1564-69 |
| Compression Set | " |
| Tensile Strength | " |
| Elongation | " |
| Tear Resistance (Strength) | " |
| Sac Factor (or Load Ratio) | " |
| Humid Age Load Loss | " |
| Resilience | " |
| CLD (Compression Load Deflection) | " |
| % Return (Value) | " |
| Foam Color Rating (or Scorch Rating) | Scale: 0-80 units<br>0: No color; 80: Dark Brown<br>Visual rating |
| Abbreviated Pill | ASTM D-2859-70 T modified ("abbreviated") by use of one test sample rather than 8 with flame spread effected by ignited methenamine pill |
| Docket No. 3-3 | Proposed Motor Vehicle Safety Standard 302 |
| Porosity | A specimen of foam ⅛ inch in thickness is compressed between two pieces of flanged plastic tubing 2¼ inches in diameter (ID). This assembly then becomes a component in an air flow system. Air at a controlled velocity enters one end of the tubing, flows through the foam specimen and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream side is adjusted to maintain a differential pressure across the specimen of 0.1 inch of water. The air porosity of the foam is reported in units of |

| Test | Procedure |
|---|---|
| | air flow per unit area of specimen, cubic feet per minute per square foot. |

EXAMPLE 1

To a three-necked, one-liter flask equipped with addition funnel, stirrer, and reflux condenser was added 321 grams of Polyol I. The polyol was heated to 110° C. with a glass-mantle while sparging with oxygen-free nitrogen. After 15 to 20 minutes of sparging with nitrogen, the following mixture was continuously fed to the flask over a 2 hour time span: Polyol I (159 grams); acrylonitrile (60 grams); styrene (60 grams); and azobisisobutyronitrile (3.0 grams). The temperature of the reaction mixture so formed was maintained at 110° C. throughout the polymerization. Less than 10 minutes after the feed of the mixture was begun, the reaction mixture became cloudy with small, apparently insoluble, particles and as the polymerization progressed, the reaction mixture became opaque with white suspended solids (less than one micron in diameter). No large particles ("granules") formed. Upon completion of monomer addition, the reaction mixture was heated at 110° C. for an additional 30 minutes and then cooled and then stripped free of unreacted monomer. The unreacted monomer was stripped for four hours on a rotary evaporator at approximately 100° C. and at less than 10 mm. of mercury absolute pressure. The unreacted monomers were trapped in dry-ice traps. Conversion of monomers to polymer (based on unreacted monomers recovered in the dry-ice traps) was in excess of 96.0 percent. The stripped, white polymer/polyol so produced had a Brookfield viscosity of 3,072 centistokes (No. 2 spindle, 100 rpm @ 25° C.).

EXAMPLE 2

Example 1 was repeated except that six times the amount of starting materials and a reaction temperature of 115° C. was employed. The polymer/polyol so produced had a viscosity of 2100 centipoises at 25° C. and is referred to hereinafter as "Polymer/Polyol I".

EXAMPLE 3

Low density flexible polyurethane foams were prepared from Polymer/Polyol I (produced by the process invention as described in Example 2 above) and, for purposes of comparison, from Polymer/Polyol A (a commercially available polymer/polyol described above under "Definitions"). The following foam formulation was used:

| Polymer/Polyol | 100 parts | 3500 grams |
|---|---|---|
| Water | 4.0 parts | 140 grams |
| Surfactant I | 1.0 parts | 35 grams |
| Bis(dimethylamino ethyl)ether | .07 parts | 2.45 grams |
| Stannous octoate | .35 parts | 12.25 grams |
| TDI | 107 Index | 1710.0 grams |

The foam formulations were converted to polyurethane foams using the following procedure: Weigh Surfactant, polymer-polyol and TDI into 8-liter, baffled stainless steel 1 beaker and mix 60 seconds at 2,000 rpm with two 2.5 inch 6 blade turbine stirrers, (placed 2.5 inches apart at base of shaft.) Stop fifteen seconds to de-gas, mix five seconds, add water/amine catalyst mixture, mix additional five seconds, and add stannous octoate and mix five seconds. Pour foam mixture into 24"×24"×20" paper-lined box. Record foam rise time. Allow to cure overnight at room temperature. "Scorch" sample slices (two inches thick) were taken from horizontal center of foam bun. Other foam physical properties were measured on a six inch sample taken from bottom of upper half of foam bun. "Scorch" evaluation is made from center of "scorch" slice sample.

The following physical properties of the foams were determined

TABLE I

| | Foam 1 | Foam 2 | % Improvement Of Foam 2 vs. Foam 1 |
|---|---|---|---|
| Polymer/Polyol | A | I | |
| Foam Rise time | ~70 seconds | 78 sec. | |
| Foam porosity (ft³/min/ft²) | 45.0 | 20.9 | |
| ILD (lbs) 25% | 61.4 | 69.5 | 13.2% |
| 65% | 114.6 | 120.0 | 4.7% |
| 25% | 33.0 | 39.3 | 19.1% |
| Return Value, % | 53.8 | 56.6 | |
| Load Ratio (65ILD/25ILD) | 1.87 | 1.73 | |
| Foam Density, pcf | 1.46 | 1.43 | |
| Compression Set, 90% | 78.7 | 16.1 | 79.5% (reduced) |
| Tensile Strength, psi | 18.8 | 22.5 | 19.7% |
| Elongation, % | 103 | 114 | 10.8% |
| Tear Resistance, lbs/in | 2.12 | 2.85 | 34.4% |
| Foam Scorch color | dark brown | cream | |

EXAMPLE 4

A series of polymer/polyol were prepared using 80 weight percent Polyol I and 20 weight percent of acrylonitrile or a mixture of acrylonitrile and styrene. The reaction temperature was 115° C. The other reaction conditions were as described in Example 1 above. Table IIA below tabulates the properties of the polymer/polyol so produced.

TABLE IIA

| Polymer/Polyol | A:S | Wt.-% CH$_2$=CHCN | Styrene | product Color | Viscosity, ctsk |
|---|---|---|---|---|---|
| D | 33:67 | 6.60 | 13.40 | white | 35,200 |
| E | 41:59 | 8.26 | 11.74 | white | 19,650 |
| F | 41:59 | 8.26 | 11.74 | white | 19,200 |
| G* | 100: | 20.00 | 0.00 | yellow | 9,450 |
| II | 50:50 | 10.00 | 10.00 | white | 2,370 |
| III | 50:50 | 10.00 | 10.00 | white | 2,080 |
| IV | 60:40 | 12.05 | 7.95 | white | 1,440 |
| V | 70:30 | 14.00 | 6.00 | cream | 1,440 |

*not a polymer/polyol of this invention

The data in Table IIA illustrates the lower viscosities of the preferred polymer/polyols of this invention (II, III, IV and V) and, as compared to Polymer/Polyol G, the improved color of the polymer/polyols of this invention. The data in Table IIA illustrates that there is a definite viscosity minimum that is a function of the composition of the copolymer for reactions conducted on this scale and with Polyol I. A plot of this data would place the viscosity-optimum acrylonitrile-styrene ratio at about 12.5/7.5, but reasonably low viscosities are obtained at acrylonitrile/styrene ratios as low as 9/11 (45:55) when the polymerization is conducted on this scale with Polyol I. Lower viscosities at the lower acrylonitrile contents are obtained by conducting the reaction continuously and/or with other polyols as shown in Example 10. Dilution of Polyols D, E, F and G with conventional polyols results in polymer/polyols of more desirable viscosity characteristics.

The polymerization temperature of 115° C. used in the polymerizations listed in Table IIA was selected as a result of a brief study concerning the relationship of Polymer/Polyol viscosity and polymerization temperatures. The results of this study are shown in Table IIB below. This relationship can be plotted to show an inflection point of the viscosity-temperature curve at 115° C. Thus 115° C. was selected as the standard polymerization temperature for other Examples. The copolymer/polyol composition in the temperature study was Polyol I/styrene/acrylonitrile (80/10/10 weight ratio).

TABLE IIB

| Temperature °C. | Viscosity |
|---|---|
| 100 | 8,280 cps |
| 110 | 3,072 cps |
| 115 | 2,080 cps |
| 115 | 2,368 cps |
| 120 | 2,100 cps |

EXAMPLE 5

Low density flexible polyurethane foams were prepared from Polymer/Polyol I and, for purposes of comparison, from Polyol I, Polymer/Polyol A and Polymer/Polyol B. The following foam formulations were used:

| Component (parts by weight) | 1 | 2 | 3 | 4 |
|---|---|---|---|---|
| Polyol I | 100 | | | |
| Polymer/Polyol A | | 100 | | |
| Polymer/Polyol I | | | 100 | |
| Polymer/Polyol B | | | | 100 |
| Water | 4.0 | 4.0 | 4.0 | 4.0 |
| Stannous octoate | .325 | .35 | .35 | .30 |
| Bis(dimethylaminoethyl)-ether | .10 | .10 | .10 | .10 |
| Surfactant I | 1.0 | 1.0 | 1.0 | 1.00 |
| TDI | 105 (Index) | 105 (Index) | 105 (Index) | 105 (Index) |

The foam formulations were converted to polyurethane foams using the procedure described in Example 3 above. The properties of the foams were as follows:

TABLE III

| Properties | Foam 1 | 2 | 3 | 4 |
|---|---|---|---|---|
| Porosity (ft³/min./ft²) | 82.8 | 48.3 | 34.5 | 58.7 |
| Resilience (% ball rebound) | 45 | 36.0 | 34 | 37 |
| ILD (lbs.) 25% | 44.5 | 60.0 | 62.0 | 37.3 |
| 65% | 78.8 | 108.7 | 113.5 | 60.2 |
| 25% | 29.8 | 33.4 | 34.0 | 16.4 |
| 25% ILD Return | 67.0 | 55.7 | 54.8 | 44.0 |
| Sac Factor | 1.77 | 1.81 | 1.83 | 1.61 |
| Density lbs/cu. ft | 1.44 | 1.45 | 1.43 | 1.59 |
| Compression Set, 90% | 3.63 | 70.2 | 23.4 | 10.2 |
| Tensile Strength, psi | 15.4 | 20.5 | 19.9 | 14.2 |
| Percent Elongation | 159 | 127 | 141 | 148 |
| Tear Resistance, lbs./in. | 2.17 | 2.29 | 2.51 | .79 |
| Humid Age Load Loss | N/A | N/A | 23.4 | 16.7 |
| Foam Color Rating | 0 | 70 | 5 | 0 |

EXAMPLE 6

Low density flexible polyurethane foams were prepared from Polymer/Polyols II, IV, V, F and D and, for purposes of comparison, from Polymer/Polyol A (see "Definitions" and Example 4 above for the composition of these polymer/polyols). The following foam formulations were used:

| | Parts by Weight |
|---|---|
| Polymer/Polyol | 100 |
| Water | 4.0 |
| Bis(dimethylaminoethyl)ether | 0.07 |
| Stannous octoate | 0.375 |
| Surfactant II | 1.0 |
| TDI | 107 index |

The foam formulations were converted to polyurethane foams using the procedure described in Example 3 above. The properties of the foams were as follows:

TABLE IV

| Polymer/Polyol | A | V | IV | II | V | D |
|---|---|---|---|---|---|---|
| Polyol I/VCN/Styrene (Weight Ratio) | 80/20/0 | 80/14/6 | 80/12.05/7.95 | 80/10/10 | 80/8.27/11.74 | 80/6.67/13.33 |
| Rise Time, sec. | 66 | 69 | 72 | 74 | 68 | 68 |
| Porosity, ft³/min/ft² | 45 | 3.8(a) | 4.0(a) | 21.4 | 29.2 | 36.5 |
| CLD (lbs.) (b) 25% | 12.7 | 15.0 | 15.8 | 13.6 | 8.28 | 6.33 |
| 65% | 23.5 | 22.60 | 24.3 | 22.8 | 18.1 | 14.10 |
| 25% | 6.90 | 9.20 | 9.7 | 8.35 | 5.14 | 4.02 |
| % Return Value | 53.8 | 61.3 | 61.5 | 59.2 | 61.7 | 63.4 |
| Load Ratio | 1.87 | 1.49 (a) | 1.53 (a) | 1.67 | 2.18 | 2.23 |
| Density, pcf | (1.46) | (1.34) | (1.40) | (1.46) | (1.46) | (1.40) |
| Compression Set, 90% | 78.7 | 84.5 | 27.8 | 55.8 | 79.1 | 79.6 |
| Tensile (b) psi | 19.3 | 24.4 | 22.9 | 20.1 | 17.7 | 12.2 |
| Elongation, % (b) | 107 | 153 | 147 | 126 | 142 | 119 |
| Tear, lbs/in (b) | 2.18 | 2.78 | 2.50 | 2.64 | 2.71 | 2.12 |
| CLD % Loss | N/A | 25.3 | 27.7 | 22.7 | 21.9 | 25.9 |

(a) Foams of very low porosity often yield anomolous load values. That is the 25% CLD is increased and as a consequence the load ratio value is often lower than normal. Compression set values are inclined to be high.
(b) All parameters sensitive to density "normalized" to 1.50 pcf density.

These data were "normalized" to a 1.50 pcf density in order to accurately assess trends in foam properties. "Normalized" means conversion of those foam physical properties sensitive to density (i.e., CLD, tensile strength, elongation and tear), to a common density, in this case by the division of property data by the following factor:

(experimental foam density)/1.50

It will be noted that as the copolymer composition decreases significantly below 50 weight percent acrylonitrile, foam properties such as compression load deflection, tensile strength, and percent elongation rapidly decrease. These decreases parallel the rapid polyol viscosity increase shown in Table IIA above. The foam data show that physical properties equal or superior to commercially available Polymer/Polyol A are achieved with Polymer/Polyol II which was produced by the process of this invention.

EXAMPLE 7

This Example illustrates the practice of the process of this invention in a continuous manner using relatively large amounts of starting materials in two stages. The first stage was conducted in a conventional Pfaudler autoclave and the second stage was conducted in a "Marco" reactor, (i.e., in a "Marco Flomaster Reactor", model number 2×290–294 whose operation is generally described in Example 1 of Canadian Patent No. 785,835).

The following materials were used in this preparation:

| Polyol I | |
|---|---|
| Hydroxyl number | 52.51 |
| ph | 6.2 |
| Alkalinity | 0.000071 |
| Color, Pt-Co | 25 |
| Water, % | 0.066 |
| Acrylonitrile | |
| Water content, % | 0.3 |
| Color, Pt-Co | 5 |
| Suspended matter | nil |
| Refractive index | 1.3894 |
| Inhibitor level, parts per million | 37 |
| Styrene | |
| Specific gravity, 20/20° C. | 0.9078 |
| Acid | nil |
| Purity, % by Wt. | 99.7 |
| Color, Pt-Co | 10 |
| Aldehydes, % by Wt. | 0.005 |
| Sulfur, ppm | 1 |
| Refractive index | 1.5475 |
| Azobisisobutyronitrile: A commercially available product, "VAZO", was used. | |

A polymer/polyol of this invention was produced by feeding a mixture of 79.311% Polyol I, 10.344% acrylonitrile, 10.344% styrene and 0.491% azobisisobutyronitrile to a five-gallon stirred autoclave that was maintained at 115°±2° C. The feed rate was 92±2 lbs per hour. The partially polymerized products of the autoclave was passed through the 3-gallon capacity Marco reactor, maintained at 115° C. The product of the Marco reactor was then put into 55 gallon drums. Unreacted monomer was stripped from the latter product in a 300 gallon stirred reactor. Intermittent sampling (30 minute intervals) of the reaction product of the Marco reactor once steady state conditions were achieved (e.g., after about 30 minutes of operation) showed that the white polymer/polyol had a uniform sample Brookfield Viscosity of 1050±50 cps (No. 3 spindle at 26° C.). Inspection of the autoclave and the Marco reactor following the 25 hour continuous polymerization showed little or no polymer deposit (scrap) residues. Monomer to polymer conversion was in excess of 95%. The polymer/polyol of this invention so produced is identified hereinafter as "Polymer/Polyol VI".

Polymer/Polyols A, C and VI were used in the following formulations to make polyurethane foams:

| Component | Amount (parts by weight) |
|---|---|
| Polyol | 100 |
| Water | 4.0 |
| Bis(dimethylamino ethyl)ether | 0.07 |
| Stannous octoate | varied* |
| Surfactant II | 1.0 |
| TDI | 105 Index |

*Concentration varied to make stable foams as in Example 8 below.

The formulations were converted to polyurethane foams as detailed in Example 3. The properties of the polymer/polyols and the foams were as follows:

| Polymer/Polyol | A | C | VI |
|---|---|---|---|
| Polymer/Polyol Color | yellow | cream | white |
| Hydroxyl Number | 44.9 | 43.5 | 43.4 |
| Brookfield Viscosity, 23° C.* | 2580 cps. | 1800 cps. | 1200 cps. |
| Stannous Octoate Concentration Range (parts by weight)** | .275–.375 | .25–.425 | .25–.375 |
| Scorch, Rating | 65–70 | 25 | <5 |

*Viscosity after removal of unreacted monomers.
**Above the concentration the cells were closed and below this concentration the foam split using the above formulations.

It is an historical finding that, as a polymer/polyol process is scaled up from the laboratory reactor (e.g., from a 1 or 2 liter flask) to a pilot unit to the plant production unit), there is an incremental reduction in product viscosity, notwithstanding the type of polymer/polyol product being made. A comparison of the viscosities of the products of Examples 1 and 7 shows the same effects on scale up.

EXAMPLE 8

Flammability tests were conducted on Polymer/Polyol VI (produced in accordance with the process of this invention as described in Example 7 above). The tests were the Abbreviated Pill Test, the Docket No. 3-3 Test and the ASTM D-1962 Test. The results are described below.

The foams tested were produced from the following formulations using the procedure described in Example 3 above:

| Component | Parts By Weight |
|---|---|
| Polyol | 100 |
| Water | 3 |
| 3 CF | as indicated |
| Surfactant | 1.0 |
| Bis(dimethyl aminoethyl)ether | 0.07 |
| Stannous octoate | * |
| TDI | 105 Index |

*Concentration was varied to make stable foams as follows: With the other formulation components held constant, the stannous octoate concentration was varied until the stannous octoate concentration which resulted in a split-free, "open" foam was determined.

In Table V are listed the results of an Abbreviated Pill Test (samples were not preconditioned and only one sample was tested). This test requires that a metheneamine pill be ignited in the center of an eight-inch diameter specimen and the unburned distance measured. The numbers in the table are the unburned distances. To pass the pill test this distance has to be one-inch or greater. A zero shows that the sample was consumed in the test.

With Surfactant II as the surfactant it is readily evident that Polymer/Polyol VI foams are the least flammable in this test. By replacing Surfactant II with Surfactant III in the formulations, the Polymer/Polyol VI foams are still superior, but only marginally so over the Polyol I foams.

TABLE V
ABBREVIATED PILL TEST

| | 3CF Content | | |
|---|---|---|---|
| Polyol | 5 parts | 10 parts | 20 parts |
| | Unburned Distance | | |
| | Surfactant II | | |
| Polymer/Polyol VI | 2⅜ in. | 3¼ in. | 3 in. |
| Polymer/Polyol C | 0 | 0 | 2⅞ in. |
| Polymer/Polyol A | 0 | 0 | 3 in. |
| Polyol I | 0 | 3-3/16 | 3½ |
| | Surfactant III | | |
| Polymer/Polyol VI | 3⅛ in. | 3⅛ in. | 3⅜ in. |
| Polymer/Polyol C | 0 | 3 in. | 3⅛ in. |
| Polymer/Polyol A | 0 | 2⅞ in. | 3¼ in. |
| Polyol I | 2⅜ in. | 3⅛ in. | 3⅛ in. |

The next test in which these foams were evaluated is the National Highway Safety Bureau, Department of Transportation Motor Vehicle Safety Standards. Criteria for passing this test is the burning rate for two horizontal samples of foam to be less than 4 in/min. The results are recorded in Table VI. In the Surfactant II series, the Polymer/Polyol A foams are obviously the most flammable. With 5 parts 3CF the Polymer/Polyol C foam has the lowest burning rate, but with 10 parts 3CF one specimen of the Polymer/Polyol A foam was self extinguishing and the other had a rate of 1.81 in/min, whereas the Polyol I samples were both self extinguishing. In the Surfactant III series, the Polymer/Polyol VI foams are slightly superior to the Polyol I foams.

TABLE VI
DOCKET NO. 3-3 TEST

| | 3CF Content | | |
|---|---|---|---|
| Polyol | 5 parts | 10 parts | 20 parts |
| | Average Burning Rate, in./min. | | |
| | Surfactant II | | |
| Polymer/Polyol VI | 1.81 | S.E.[a] | S.E. |
| Polymer/Polyol C | 1.46 1.21, | S.E.[b] | S.E. |
| Polymer/Polyol A | 2.30 1.81, | S.E. 3.57, | S.E. |
| Polyol I | 2.06 | S.E. | S.E. |
| | Surfactant III | | |
| Polymer/Polyol VI | S.E. | S.E. | S.E. |
| Polymer/Polyol C | S.E. | S.E. | S.E. |
| Polymer/Polyol A | S.E. 1.41, | S.E. | S.E. |
| Polyol I | 1.58 | S.E. | S.E. |

[a] S.E. means self extinguishing and indicates that the sample burned less than 1.5 inches.
[b] Two samples tested, one was S.E. and the other burned more than 1.5 inches.

The next test to be employed was the ASTM D-1692. Here five specimens are tested and each has to extinguish before burning five inches. This is usually regarded as the most difficult test of these three tests described in this Example. In Table VII the burning rate, extent of burn and rating are listed for this series of foams. Table VII shows that the Polymer/Polyol A foams are the most flammable and Polymer/Polyol C foams are more flammable than Polymer/Polyol VI and Polyol I foams.

TABLE VII
ASTM D-1692 TEST

| | 3CF Content | | |
|---|---|---|---|
| | 5 parts | 10 parts | 20 parts |
| Polyol | Rating, Rate (in.min.), Extent (in.) | | |
| | Surfactant II | | |
| Polymer/Polyol VI | B[a],3.19,5 | S.E.,2.69,2.0 | S.E.,2.51,1.3 |
| Polymer/Polyol C | B,3.12,5 | B,2.88,5 | S.E.,2.23,2.1 |
| Polymer/Polyol A | B,3.50,5 | B,2.75,5 | B,2.17,5 |
| Polyol I | B,2.95,5 | S.E.,2.24,2.3 | S.E.,1.90,1.0 |
| | Surfactant III | | |
| Polymer/Polyol VI | S.E.,3.46,1.8 | S.E.,2.80,1.4 | S.E.,2.00,0.9 |
| Polymer/Polyol C | S.E.,3.33,2.4 | S.E.,2.81,1.7 | S.E.,2.28,1.5 |
| Polymer/Polyol A | B,3.44,5 | S.E.,2.13,2.27 | S.E.,1.83,3.85 |
| Polyol I | S.E.,2.35,2.25 | S.E.,1.65,1.37 | S.E.,1.77,0.4 |

[a] B means burning.

EXAMPLE 9

The polymer/polyols shown in Table VIII below were converted to polyurethane foams using the general procedure described in Example 3 above and using the formulations shown in Table IX below. The properties of the foams are shown in Table X below. The foam properties show that, overall, the polymer/polyols of the invention (Polymer/Polyols VI, VII, VIII and IX) produced from various polyol starting materials (Polyols I, II, III and IV) resulted in good foams.

TABLE VIII

| Polymer/Polyol | Base Polyol Mol. Wt. | Viscosity, cps. | Polymer/Polyol Composition (wt. ratios) (1) |
|---|---|---|---|
| A | 3,000 | 2,000 | Polyol I/VCN (80/20) |
| D | 4,950 | 3,800 | Polyol III/VCN (80/20) |
| VI | 3,000 | 1,200 | Polyol I/VCN/Styrene (80/10/10) |
| VII (2) | 3,700 | 1,200 | Polyol IV/Styrene/VCN (80/10/10) |
| VIII (3) | 3,740 | 1,200 | Polyol II/Styrene/VCN (80/10/10) |
| IX (4) | 4,950 | 2,200 | Polyol III/VCN/Styrene (80/10/10) |

(1) VCN denotes acrylonitrile.
(2) produced by the general process used in Example 2 using the starting materials shown in this Table.
(3) produced by the general process used in Example 2 using the starting materials shown in this Table.
(4) produced by the general process used in Example 2 using the starting materials shown in this Table.

TABLE IX

| Foam Formulation | Amounts (parts by weight) | | | | | |
|---|---|---|---|---|---|---|
| | 1 | 2 | 3 | 4 | 5 | 6 |
| Polymer/Polyol | | | | | | |
| A | 100 | | | | | |
| VI | | 100 | | | | |
| VII | | | 100 | | | |
| VIII | | | | 100 | | |
| D | | | | | 100 | |
| IX | | | | | | 100 |
| H₂O | 4.0 | 4.0 | 4.0 | 4.0 | 4.0 | 4.0 |
| bis(dimethyl aminoethyl/ether | .07 | .07 | .052 | .035 | .021 | .021 |
| stannous octoate | .30 | .35 | .275 | .30 | .175 | .175 |
| Surfactant I | 1.0 | 1.0 | 1.0 | 1.0 | 1.0 | 1.0 |
| TDI, Index | 105 | 105 | 105 | 105 | 105 | 107 |

TABLE X

| Foam Properties | 1 | 2 | 3 | 4 | 5 | 6 |
|---|---|---|---|---|---|---|
| Foam** | | | | | | |
| Scorch rating (1) | 65 | 5 | 5 | 5 | — | — |
| Porosity, ft³/min/ft² | 55 | 34.5 | 51.2 | 24 | 32 | 29.2 |
| Resilience, % ball rebound | 32 | 35 | 35 | 35 | 27 | 30 |
| ILD 25% (lbs)* | 61.0 | 65.0 | 60.2 | 63.2 | 65.1 | 69.2 |
| 65% | 113.2 | 119.0 | 97.0 | 112.0 | 124.5 | 136.0 |
| 25% (return) | 34.4 | 35.6 | 33.0 | 35.3 | 32.3 | 36.4 |
| % Return | 56.5 | 54.8 | 54.8 | 55.5 | 49.6 | 52.6 |
| Load Ratio | 1.86 | 1.83 | 1.61 | 1.77 | 1.91 | 1.96 |
| Density, pcf | 1.52 | 1.43 | 1.46 | 1.55 | 1.65 | 1.69 |
| Compession Set 90% Compression, Height Loss, % | 36.7 | 23.4 | 7.84 | 9.35 | 66.7 | 35.5 |
| Tensile*, psi | 18.7 | 20.8 | 19.8 | 22.7 | 18.0 | 16.9 |
| Elongation*,% | 120 | 148 | 171 | 148 | 123 | 93 |
| Tear*,lbs/in | 2.11 | 2.63 | 2.88 | 2.87 | 3.37 | 2.96 |
| 5 Hour Humid Age Load Loss | 19.2 | 23.4 | 23.5 | 18.7 | N/A | N/A |

*Date sensitive to density variation "normalized" to 1.50 pcf.
**Foam produced from the correspondingly numbered foam formulation.
(1) Foam scorch rating: 0–80 Scale with 0 being white (no scorch) and 80 being dark brown (severe scorch).

An important consideration in the production of polymer/polyols in accordance with this invention is the improvement in the conversion of volatile monomer to non-volatile copolymer. This latter finding improves process economics and efficiency. The conversions of the monomer to polymer were as follows in the preparation of the various polymer/polyol compositions described above:

| Polymer/Polyol | % Conversion of Monomer |
|---|---|
| I | over 96% |
| II | over 95% |
| III | over 97% |
| IV | about 98% |
| V | about 95% |
| VI | over 95% |
| VII | over 95% |
| VIII | over 95% |
| IX | over 95% |

The above % conversions were calculated based on unreacted monomers recovered as described in Example 1 above.

EXAMPLE 10

This Example illustrates the practice of the process of this invention in a two-stage, continuous manner using the indicated amounts of starting materials (Polyol III, acrylonitrile, styrene and "VAZO").

The first stage reactor was a 550 cubic centimeters continuous stirred tank reactor and the second stage reactor was an unagitated column reactor with a 5:1 height to diameter ratio and a volume of 1800 cubic centimeters. The first stage reactor was fitted with four baffles and a four bladed turbine impeller. The second stage was not agitated.

The feed components were pumped to the bottom of the first stage reactor continuously after going through an inline mixer to assure complete mixing of the feed components before entering the reactor. The effluent from the top of the first stage reactor was fed into the bottom of the second stage reactor with flow upward through the second stage. The internal temperatures of both reactors were controlled to the same temperature to within one degree Centigrade by controlled heating or cooling to the outside of both reactors. The product from the top of the column reactor flowed out the top of the reactor to a back pressure regulator adjusted to 10 pounds per square inch gauge back pressure and then through a water cooled tubular heat exchanger to a product receiver. Portions of the crude product were vacuum stripped at 2 millimeters pressure and 120° to 130° C. for testing. Conversions were determined from gas chromatic analysis of the amount of unreacted monomers present in the crude product.

The details of four polymer/polyol preparations following the above procedure are shown in Tables XI and XII below.

TABLE XI

| Run No. | 1 | 2 | 3 | 4 |
|---|---|---|---|---|
| Reaction Temperature, °C. | 109 | 130 | 120 | 119 |
| "VAZO" (1) Conc., Wt. % in Feed | 0.29 | 0.50 | 0.40 | 0.4 |
| Residence Time, min. | | | | |
| -1st Stage | 17.6 | 17.7 | 19.7 | — |
| -2nd Stage | 57.5 | 57.9 | 64.4 | — |
| -Total | 75.1 | 75.6 | 84.1 | — |
| Monomer Content in Feed, Wt. % | 18.8 | 25.2 | 22.1 | 22 |
| Ratio of Acrylonitrile to Styrene | 40/60 | 40/60 | 30/70 | 20/80 |
| First Stage Agitator Speed, rpm | 400 | 400 | 600 | 800 |
| Polyol III Feed Rate, gms/hr | 1534 | 1412 | 1308 | Reactor Plugged |
| Monomer Feed Rate, gms/hr | 356 | 476 | 372 | |
| Product Weight, gms/hr | 1878 | 1864 | 1676 | — |
| Material Balance, % | 99.4 | 98.7 | 99.0 | Run Not Completed |
| Reaction Pressure, psig | 10 | 10 | 10.5 | |
| Residual: | | | | |
| Acrylonitrile-First Stage, % | 1.41 | 1.16 | 0.96 | |
| Acrylonitrile-Second Stage | 0.71 | 0.69 | 0.47 | |
| Styrene-First Stage | 1.57 | 1.17 | 2.12 | |
| Styrene-Second Stage | 0.59 | 0.55 | 1.07 | |
| TMSN (2)-First Stage | 0.14 | 0.21 | 0.18 | |
| TMSN (2)-Second Stage | 0.15 | 0.19 | 0.17 | |
| Conversions: | | | | |
| Acrylonitrile-First Stage, % | 81.4 | 88.6 | 85.6 | |
| Acrylonitrile-Total, % | 90.6 | 93.2 | 92.9 | |
| Styrene-First Stage, % | 86.2 | 92.4 | 86.0 | |
| Styrene-Total, % | 94.8 | 96.4 | 93.1 | |
| Combined-First Stage, % | 84.3 | 90.9 | 86.1 | |
| Combined-Total, % | 93.1 | 95.1 | 93.1 | |

(1) "VAZO-64": 2,2'azo-bis-isobutyronitrile.
(2) TMSN: tetramethyl succinonitrile produced by decomposition of VAZO.

TABLE XII

| Run No. | 1 | 2 | 3 |
|---|---|---|---|
| VAZO Converted to TMSN % (a) | 59.7 | 48.0 | |
| Total Poly A in Product (Calc., %) | 6.9 | 9.5 | 6.3 |
| Total Poly S in Product (Calc., %) | 10.9 | 14.8 | 14.7 |
| Total Polymer in Product (Calc., %) | 17.8 | 24.3 | 20.9 |
| Total Poly A in Product (anal., %) | 8.1 | 10.7 | 7.6 |
| Total Poly S in Product (anal., %) | 10.4 | 14.4 | 14.7 |
| Total Polymer in Product (anal., %) | 18.5 | 25.1 | 22.2 |
| Product Properties | | | |
| Viscosity (Hoeppler) at 25° C., cps | 1794 | 3439 | 3417 |
| Light Transmission, % (b) | 47 | 55 | 58.6 |
| Hydroxyl No., mg KOH per gm. | 28.5 | 26.1 | 26.6 |
| Acid No. | 0.018 | 0.009 | |
| pH (c) | 8.1 | 8.7 | |
| Color Rating of Polymer Polyol (h) | 1.2 | 3.6 | 0 |
| Water, % | 0.04 | 0.05 | 0.019 |
| Appearance Rating (d) | 5 | 4 | 3 |
| Filterability (e) | | | |
| 150 mesh-Time, min. | 8.5 | 14.0 | 12.9 |
| % Thru | 100 | 100 | 100 |
| 700 mesh-Time, min. | 20 | 5.0 | 20 |
| % Thru | 66 | 100 | 70 |
| Appearance of Sample Bottle (f) | 2 | 4 | 4 |
| Sediment Rating (g) | 4 | 6 | 7 |

(a) $\dfrac{TMSN \times 164}{VAZO \times 136} \times 100 = \dfrac{TMSN}{VAZO} \times 1.205 \times 100 = \%$.

TABLE XII-continued

| Run No. | 1 | 2 | 3 |
|---|---|---|---|

(b) 500 millimicrons with 0.01% polymer in Polyol I diluent.
(c) pH of Polyol III was 8.4 in Runs 1 & 2 and 7.9 in Runs 3 & 4 (Two batches of Polyol III were used)
(d) Appearance rating of glass silde dipped in product and allowed to drain. Rating: 0 is clear; 10 is streaky white film-generally continuous.
(e) Unstripped samples. For 150 mesh samples undiluted and For 700 mesh samples diluted 2 to 1 with isopropanol.
(f) Rating: 0 is clear and 5 is whitish residue.
(g) Sediment in sample bottle. Rating: 0 is none and 9 is continuous white cake.
(h) Rating: 0 is white; 10 is light tan The data in Table XII indicates that polymer polyols having fairly low viscosities can be produced from monomer mixtures containing a fairly high proportion of styrene when the polyol is Polyol III and when the reaction is conducted continuously. Run 4 in Table XI illustrates the problems encountered when styrene is employed in relatively large amounts.

EXAMPLE 11

Five experiments were conducted to repeat runs g, h, l, m and n of Example 6 of Canadian Patent No. 785,835. The reactor and the procedure were essentially as described in Example 6 of the Canadian Patent. Data relating to these experiments is shown in Table XIII.

TABLE XIII

| Run | $g^1$ | $h^1$ | $l^1$ | $m^1$ | $n^1$ |
|---|---|---|---|---|---|
| Polymerization Data | | | | | |
| Polyol I (1) | 80 | 80 | 80 | 80 | 80 |
| Acrylonitrile (1) | 10 | 5 | 18 | 16 | 14 |
| Styrene (1) | 10 | 15 | 2 | 4 | 6 |
| Azobisisobutyronitrile (1) | 0.5 | 0.5 | 0.5 | 0.5 | 0.5 |
| Temperature, °C. | 89 | 91 | 103 | 98 | 98 |
| Pressure, psig | 23 | 23 | 32 | 38 | 28 |
| Total Feed (lbs.) | 108 | 83 | 555 | 410 | 495 |
| Brookfield Viscosity, cps | 1150 | 1325 | 3450 | 2900 | 1750 |
| Hydroxyl Number | 46.0 | 47.6 | 44.1 | 45.1 | 44.3 |

(1) parts by weight

Separate portions of the polymer polyols produced as described above were passed through screens of various mesh. The results are shown in Table XIV below:

TABLE XIV

| Polymer/ Polyol From Run | Weight Percent Passed Through Screen | | | |
|---|---|---|---|---|
| | 0.1 inch (2,540 microns) | 80 Mesh (175 microns) | 150 Mesh (105 microns) | 700 Mesh (25 microns) |
| $g^1$ | 100 | 7.5 | 2.4 | 0.2 |
| $h^1$ | >99 | 0 | — | — |
| $l^1$ | — | — | 31.8 | 0 |
| $m^1$ | — | — | 13.1 | 0.07 |
| $n^1$ | — | — | 0.3 | 0 |
| Polymer Polyol VI | 100 | 100 | 100 | 100 |
| Polymer Polyol A | 100 | 100 | 100 | 100 |

The data in Table XIV shows that the polymer polyol of this invention and the prior art commercial polymer polyol have significantly smaller polymer particle sizes than the polymer polyols produced by the process of Example 6 of the Canadian Patent.

The polymer polyols of this Example were converted to polyurethane foams using the formulations and procedure of Example 3 above. The scorch ratings of the foams are shown in Table XV below.

TABLE XV

| Polymer Polyol of Run | A:S | Scorch Rating* |
|---|---|---|
| $g^1$ | 50:50 | 10 |
| $h^1$ | 25:75 | 0 |
| $l^1$ | 90:10 | 55 |
| $m^1$ | 80:20 | 40 |
| $n^1$ | 70:30 | 30 |
| Polymer/Polyol VI | 50:50 | 10 |
| Polymer/Polyol A | 100:0 | 70 |

*Rating scale is 0 to 80; 0 indicates no scorch; 80 indicates severe scorch

The results in Table XV show that scorching becomes increasingly severe as the ratio of acrylonitrile to styrene increases. The polyurethane foam produced from Polymer/Polyol A exhibited significantly higher firmness as shown by its ILD values and significantly higher compression set as compared to the other foams. No other significant differences in the physical properties of the foams were observed.

In prolonged production, the following advantages were observed for Polymer/Polyol IX as compared to Polymer/Polyol D. The Polymer/Polyol IX was white and was convertible to white polyurethane foam. The monomer cost for producing Polymer/Polyol IX was less because styrene is cheaper than acrylonitrile. Less heat is released in the polymerization of the monomers used in producing Polymer/Polyol IX and Polymer/Polyol IX has a lower viscosity. Less reactor fouling and a higher overall conversion of monomers (99% vs. 88%) is obtained with Polymer/Polyol IX.

The bis(dimethylamino ethyl)ether used as a catalyst in producing polyurethane foams as described in the above Examples was employed in the amounts shown in the Examples. Not shown in the Examples is the amount of solvent (dipropylene glycol) in which the catalyst as used in each Example was dissolved. For each case, the solution contained 70 weight percent catalyst and 30 weight percent glycol.

What is claimed is:

1. A method for producing a polyurethane foam by reacting and foaming (a) a fluid polymer-polyol composition which is convertible to a polyurethane foam having reduced scorch by reaction with water and an organic polyisocyanate and which is the free radical catalyst-catalyzed reaction product formed by polymerizing (1) from 10 to 30 weight percent of a mixture of (a) from 33 to 75 weight percent of acrylonitrile or methacrylonitrile and (b) from 25 to 67 weight percent styrene or alpha-methyl styrene, said weight percents of the nitrile and the styrene or alpha-methyl styrene being based on the total weight of those materials dissolved or dispersed in (2) from 70 to 90 weight percent of a normally liquid polyoxyalkylene polyol having a hydroxyl number from 20 to 150, said weight percent of the mixture and polyol being based on the total weight of the monomers and the polyol and said polymer consisting essentially of polymer particles having diameters less than one micron suspended in the polyol, (b) an organic polyisocyanate, (c) a catalyst for the reaction of (a) and (b) to produce the polyurethane, (d) a blowing agent, and (e) a foam stabilizer.

2. A method as claimed in claim 1 wherein the foam is a flexible foam, the reaction and foaming are performed by the one shot technique, the polymer/polyol composition is an alkylene oxide adduct of a polyhydroxyalkane, the blowing agent is water and the water is used in an amount to provide a foam having a density of less than 1.75 pounds per cubic foot.

3. A method as claimed in claim 1 wherein the monomer mixture contains (a) from 50 to 75 weight percent of acrylonitrile or methacrylonitrile and (b) from 25 to 50 weight percent styrene or α-methyl styrene.

4. A method as claimed in claim 1 wherein the monomer mixture contains about 50 weight percent acrylonitrile and about 50 weight percent styrene.

5. A method as claimed in claim 1 wherein the monomer mixture contains about 41 weight percent acrylonitrile and about 59 weight percent styrene.

6. A method as claimed in claim 1 wherein the monomer mixture contains about 45 weight percent acrylonitrile and about 55 weight percent styrene.

7. A method as claimed in claim 1 wherein the monomer mixture contains (a) from 45 to 75 weight percent acrylonitrile and (b) from 25 to 55 weight percent styrene, wherein the free radical catalyst is azobisisobutyronitrile, and wherein the polyol comprises propylene oxide units or propylene oxide and ethylene oxide units.

8. A method as claimed in claim 1 or 3 wherein the polyol has a hydroxyl number from 30 to 70.

9. A method for producing a polyurethane foam by reacting and foaming (a) a fluid polymer-polyol composition which is convertible to a polyurethane foam having reduced scorch by reaction with water and an organic polyisocyanate and which is the free radical catalyst-catalyzed reaction product formed by polymerizing (1) from 10 to 30 weight percent of a mixture of (a) from 33 to 75 weight percent of acrylonitrile or methacrylonitrile and (b) from 25 to 67 weight percent styrene or alpha-methyl styrene, said weight percents of the nitrile and the styrene or alpha-methyl styrene being based on the total weight of those materials dissolved or dispersed in (2) from 70 to 90 weight percent of a normally liquid polyoxyalkylene polyol having a hydroxyl number from 20 to 150, said weight percent of the mixture and polyol being based on the total weight of the monomers and the polyol, said polymer consisting of small polymer particles which, at the time the reaction mixture is formed, remain suspended in the polyol, (b) an organic polyisocyanate, (c) a catalyst for the reaction of (a) and (b) to produce the polyurethane, (d) a blowing agent, and (e) a foam stabilizer.

10. A method for producing a polyurethane foam by reacting and foaming (a) a fluid polymer-polyol composition which is convertible to a polyurethane foam having reduced scorch by reaction with water and an organic polyisocyanate and which is the reaction product formed by polymerization of (1) from 10 to 30 weight percent of a mixture of (a) from 33 to 75 weight percent of acrylonitrile or methacrylonitrile and (b) from 25 to 67 weight percent styrene or alpha-methyl styrene, said weight percents of the nitrile and the styrene or alpha-methyl styrene being based on the total weight of those materials dissolved or dispersed in (2) from 70 to 90 weight percent of a normally liquid polyoxyalkylene polyol having a hydroxyl number from 20 to 150, said weight percent of the mixture and polyol being based on the total weight of the monomers and the polyol, said polymerization being carried out in the presence of a free radical catalyst in a stirred reactor and at a temperature at which the half life of the catalyst is no longer than six minutes, and said polymer consisting of small polymer particles which, at the time the reaction is formed, remain suspended in the polyol, (b) an organic polyisocyanate, (c) a catalyst for the reaction of (a) and (b) to produce the polyurethane, (d) a blowing agent, and (e) a foam stabilizer.

* * * * *